United States Patent Office 3,681,300
Patented Aug. 1, 1972

3,681,300
COPOLYMERS OF CYCLIC MONOOLEFINS AND OMEGA-ALKENYL-POLYCYCLOALKENE COMPOUNDS
Carl A. Uraneck and John E. Burleigh, Bartlesville, Okla., assignors to Phillips Petroleum Company
No Drawing. Filed July 27, 1970, Ser. No. 58,667
Int. Cl. C08f 19/00
U.S. Cl. 260—80.78
24 Claims

ABSTRACT OF THE DISCLOSURE

Cyclic monoolefins are copolymerized with omega-alkenyl-polycycloalkene compounds. Further, copolymers of cyclic monoolefins, omega-alkenyl-polycycloalkene compounds and acyclic olefins are prepared. The polymers produced have improved properties which enables them to be used successfully in various applications.

FIELD OF THE INVENTION

This invention relates to the preparation of polymers of cyclic monoolefins. In another aspect, the invention relates to the preparation of copolymers of cyclic monoolefins and omega-alkenyl-polycycloalkene compounds. In a further aspect, the invention relates to the preparation of copolymers of cyclic monoolefins, omega-alkenyl-polycycloalkene compounds and acyclic olefins. In still a further aspect, the invention relates to new copolymers of cyclic monoolefins.

DESCRIPTION OF THE PRIOR ART

The preparation of polymers by the polymerization of cyclic monoolefins is known in the art. Exemplary of such polymer preparations is the polymerization of cyclopentene in the presence of tungsten or molybdenum chlorides in conjunction with organoaluminums to provide a linear polymer having a rather high proportion of gel. See Natta et al., Angew. Chem. internat. Edit. 3, 733, 725 (1964). Recently, other catalyst systems have been discovered which produce linear polymers of cyclic monoolefins. However, the cyclic olefin polymers which are so produced by the processes of the prior art and which have a processable molecular weight range also have a very high degree of cold flow rendering the product difficult to handle during storage, shipment, and the like. Furthermore, the polymerization of cyclic monoolefins to low cold flow polymers results in polymers having very high molecular weights. These very high molecular weight polymers are unfit for processing in most industrial applications.

In concurrently filed U.S. patent application Ser. No. 58,728, filed July 27, 1970 there is disclosed the preparation of copolymers of cyclic monoolefins and cyclic polyolefins and the preparation of copolymers of cyclic monoolefins, cyclic polyolefins and acyclic olefins. As described therein, the polymers of cyclic monoolefins, cyclic polyolefins and acyclic olefins exhibit a balance of the properties of molecular weight and cold flow which enable these polymers to be used in a variety of applications.

OBJECTS OF THE INVENTION

It is an object of this invention to provide improved polymers of cyclic monoolefins having a reduced tendency to cold flow. It is another object of the invention to provide improved polymers of cyclic monoolefins having satisfactory molecular weights for ease in processing. Other objects and advantages of the present invention will be apparent from a careful reading of the summary of the invention, the detailed description of the invention, the examples, and the claims.

SUMMARY OF THE INVENTION

We have discovered new copolymers of cyclic monoolefins and omega-alkenyl-polycycloalkene compounds.

Further, we have discovered new copolymers of cyclic monoolefins, omega-alkenyl-polycycloalkene compounds, and acyclic olefins.

Further, we have discovered a process of preparing copolymers of cyclic monoolefins and omega-alkenyl-polycycloalkene compounds which comprises contacting the monomers with a catalyst suitable for the olefin disproportionation reaction.

Further in accordance with the invention, we have discovered a process of preparing copolymers of cyclic monoolefins, omega-alkenyl-polycycloalkene compounds, and acyclic olefins which comprises contacting the monomers with a suitable olefin disproportionation catalyst.

As reported in the concurrently filed U.S. patent application mentioned above, the comonomer employed to prepare the polymers of that invention is a cyclic polyolefin having at least 2 carbon-carbon double bonds separated by one carbon-carbon single bond or fused ring cyclic polyolefin having at least one carbon-carbon double bond in each of at least two rings. We have discovered that omega-alkenyl-polycycloalkene compounds can be employed in place of, or in combination with, the cyclic polyolefin comonomers. The copolymers of this invention which incorporate therein the omega-alkenyl-polycycloalkene compounds exhibit the desirable properties of reduced cold flow using much lower levels of the omega-alkenyl-polycycloalkene compounds or mixtures of these compounds with the above-described cyclic polyolefins when compared to copolymers using the above-described cyclic polyolefin comonomers alone.

DETAILED DESCRIPTION OF THE INVENTION

The cyclic monolefin monomers used to prepare the polymers of the invention comprise cyclic monoolefins having 5, and 7–10 carbon atoms in the ring, including alkyl substituted derivatives thereof, wherein the alkyl group has from 1 to about 6 carbon atoms per molecule and is located no closer than the 4-position with regard to the double bond. Exemplary compounds include cyclopentene, cycloheptene, cyclooctene, cyclononene, cyclodecene, 4-methylcyclopentene, 4-ethylcyclopentene, 4-hexylcyclodecene, and 4-pentylcyclopentene, and the like. Preferably, the cyclic monoolefin is unsubstituted.

The omega-alkenyl-polycycloalkenes which are used in the present invention are dienes containing a terminal unsaturated of the vinyl type in an aliphatic chain and unsaturation in a polycyclic system. Non-limited examples of omega-alkenyl-polycycloalkenes which can be used in the copolymerization process according to the present invention include:

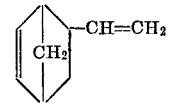

2-vinyl-bicyclo(2,2,1)heptene-5 (also commonly known as 5-vinyl-2-norbornene)

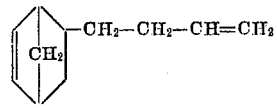

2-buten-3'-yl-bicyclo(2,2,1)-heptene-5

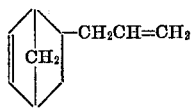

2-allyl-bicyclo(2,2,1)-heptene-5

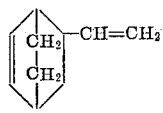

2-vinyl-bicyclo(2,2,2)octene-5

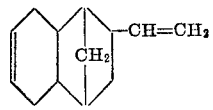

2-vinyl-1,4-endomethylen-1,2,3,4,5,5a,8,8a-octahydro-naphthalene

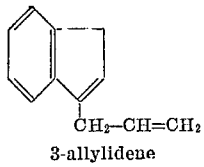

3-allylidene

Most of these monomers can be easily obtained by means of Diels-Alder condensation reactions.

For instance, 2-vinyl-bicyclo(2,2,1)-heptene-5 can be obtained by the condensation of 1 mole of cyclopentadiene and 1 mole of butadiene-1,3; 2-buten-3'-yl-bicyclo(2,2,1)-heptene-5 can be obtained by the condensation of cyclopentadiene and diallyl.

Mixtures of the above-mentioned omega-alkenyl-polycycloalkene compounds and cyclic polyolefins can be employed to provide the polymers of the invention. The cyclic polyolefins employed are cyclic hydrocarbons having at least two carbon-carbon double bonds separated by one carbon-carbon single bond or fused ring cyclic polyolefins having at least one carbon-carbon double bond in each of at least two of the rings. The term "cyclic polyolefin" is meant to exclude those cyclic hydrocarbons or fused ring cyclic hydrocarbons in which each ring is aromatic in nature. Preferred cyclic polyolefins are conjugated diolefins having from 5 to about 12 carbon atoms per molecule. Cyclopentadiene, 1,3-cyclohexadiene, 1,3-cyclooctadiene, 1,3,5-cyclooctatriene, 1,3,5-cyclododecatriene, and 1,2,3,4,4a,8a-hexahydranapthalene are exemplary of the preferred cyclic conjugated dienes which may be employed in the invention.

Preferred fused ring hydrocarbons which can be employed in the invention are those having from about 7 to about 20 carbon atoms per molecule. Exemplary preferred compounds include dicyclopentadiene, bicyclo(2,2,1)-hepta-2,5-diene, tricyclo(5,2,3,0$^{4,9}$)-dodeca-2,5,11-triene, bicyclo(2,2,2)-octa-2,5,7-triene and bicyclo(8,6,4)-eicosa-2,11-diene.

The acyclic olefins employed to prepare the cycloolefin, omega-alkenyl-polycycloalkene, acyclic olefin terpolymers of the invention are nontertiary, acyclic mono- and polyenes having at least 2 carbon atoms per molecule, including cycloalkyl, cycloalkenyl, and aryl derivatives thereof, and mixtures of these olefins. Acyclic olefins having from 2 to about 30 carbon atoms are preferred. Especially good results are obtained with acyclic monoolefins and diolefins having from about 5 to about 10 carbon atoms per molecule. Nontertiary olefins are those olefins having at least one double bond wherein the carbon atoms, which are attached to each other by means of the double bond, are also attached to at least one hydrogen atom.

Some specific examples of acyclic olefins which are suitable comonomers include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,3-pentadiene, 1,4-pentadiene, 1,4,7-dodecatriene, 2-methyl-4-octene, 4-vinylcyclohexene, 1,3-octadiene, 1,7-octadiene, 3,5-decadiene, 1,5-eicosadiene, 2-triacontene, 2,6-dodecadiene, 1,4,7,10,13-octadecapentaene, 8- cyclopentyl-4,5-dimethyl-1-decene, 6,6-dimethyl-1,4-octadiene, and the like, and mixtures thereof.

The polymerization of the above-described monomers is accomplished by the use of a catalyst known in the art as an olefin disproportionation catalyst. These catalysts have heretofore been employed to convert olefinic materials into other olefinic materials wherein the reaction can be visualized as the reaction between two first pairs of carbon atoms, the two carbon atoms of each first pair being connected by a double bond, to form two new pairs from the carbon atoms of the first pairs, the two carbon atoms of each new pairs being connected by a double bond. Although not completely understood, it is believed the disproportionation reaction occurs via a saturated transition state intermediate. Thus, the reaction can be illustrated by the following formulas:

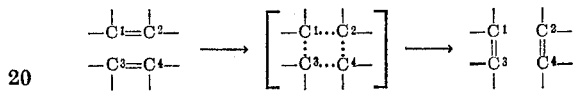

Other terms have been employed in the art to describe the olefin disproportionation reaction and catalysts which effect this reaction. They include such terms as "olefin reaction", "olefin dismutation", "transalkylidensation" and "olefin metathesis".

Any catalyst having activity for converting olefins in accordance with the above-described olefin disproportionation reaction can be employed to prepare the copolymers of the invention. These include both heterogeneous catalysts which are capable of olefin disproportionation activity in the presence or absence of a liquid hydrocarbon solvent and homogeneous catalyst which generally utilize the presence of a diluent during the reaction. Of course, where the olefin or monomer is liquid under normal reaction conditions, it can function as a diluent for the homogeneous catalysts. For the preparation of the copolymers of the invention, the homogeneous catalysts are preferred.

The heterogeneous catalysts which are particularly suitable for the polymerization reaction include tungsten oxide on silica, tungsten oxide on alumina, molybdenum oxide on alumina, rhenium oxide on alumina, molybdenum oxide on aluminum phosphate, molybdenum hexacarbonyl on alumina and any of the above in admixture with an organometal reducing agent such as methylaluminum sesquichloride. These catalysts are disclosed in U.S. Pats. 3,261,879 (Banks) of July 19, 1966; U.S. 3,365,513 (Heckelsberg) of Jan. 23, 1968; British Pat. 1,054,864 (British Petroleum) of Jan. 11, 1967; U.S. 3,463,827 (Banks) of Aug. 26, 1969; U.S. application Ser. No. 846,977 filed Aug. 1, 1969, now abandoned in favor of continuation application Ser. No. 102,883, filed Dec. 30, 1970; and U.S. application Ser. No. 816,052 filed Apr. 14, 1969.

The preparation, activation and maintenance of the heterogeneous olefin disproportionation catalysts are known in the art, and with reference to the specific systems discussed above, are disclosed in the above-mentioned patents and applications. The various solid catalysts exhibit different optimum reaction temperatures, pressures and contact times for the polymerization of the monomers of the invention. Generally, the preferred temperature, pressure, and time for the polymerization reaction will be substantially the same as the optimum conditions at which the olefin disproportionation catalyst will convert lower molecular weight acyclic olefins such as propylene, butenes, and pentenes. Excessively high reaction temperatures at which the monomers tend to decompose should be avoided.

The homogeneous catalysts which are particularly suited for the polymerization reaction comprise (a) a transition metal compound in admixture with (b) an organometallic compound. These catalysts are known in the art. Particularly suitable catalysts are disclosed in U.S. Pat. 3,492,278

(Uraneck et al.) of Jan. 27, 1970; U.S. application Ser. No. 810,021 filed Mar. 24, 1969, now U.S. Pat. 3,558,517 of Jan. 26, 1971; U.S. application Ser. No. 717,026 filed Mar. 28, 1968, now U.S. Pat. 3,558,515 of Jan. 26, 1971; and U.S. application Ser. No. 717.028 filed Mar. 28, 1968, now abandoned in favor of continuation application Ser. No. 137,676, filed Apr. 26, 1971. The most preferred homogeneous catalysts are those comprising a Group VIB metal compound in admixture with an organoaluminum halide compound as disclosed in the 717,028 application.

Some suitable examples of the homogeneous catalysts which can be used include niobium pentachloride with triisobutylaluminum; tantalum pentachloride with triisobutylaluminum; molybdenum trichloride distearate with diethyl aluminum chloride, ethylaluminum dichloride, methylaluminum sesquichloride or ethylaluminum sesquichloride; bis(triphenylphosphine)molybdenum tetrachloride with methylaluminum sesquichloride; molybdenum hexacarbonyl or triphenylphosphine molybdenum pentacarbonyl with ethylaluminum dichloride; molybdenum trichloride dioctanoate with diethylaluminum chloride; tungsten tetrachloride distearate with diethylaluminum chloride; molybdenum trichloride dilaurate, molybdenum trichloride distearate, molybdenum oxychloride stearate or tungsten tetrachloride distearate with diethylmagnesium; bis(triphenylphosphine)rhenium oxytribromide, bis(triphenylphosphine)rhenium oxytrichloride or bis(triphenylphosphine)rhenium tetrachloride with ethylaluminum dichloride; and dinitrosylruthenium chloride, or bis[tris($\pi$-allyl)rhodium chloride] with methylaluminum sesquichloride.

The preparation and use of homogeneous catalysts to effect the olefin disproportionation reaction are known in the art. Generally, the optimum conditions at which the catalyst effects the olefin disproportionation of lower molecular acyclic olefins such as pentenes and hexenes are employed for the polymerization reaction. When using the homegeneous catalysts, the molar ratios chosen of the organometallic reducing agent to the transition metal compound is also a function of monomer purity. Cyclic monoolefin, omega-alkenylpolycycloalkene, and cyclic polyolefin monomers frequently contain impurities which may react with the catalyst components. Accordingly, the monomers are preferably purified prior to contact with the homogeneous or heterogeneous catalysts. Molecular sieves can be employed to purify the monomers. The success of the purification operation will determine the optimum mol ratio of the organometallic compound to the transition metal compound. Whenever the feed does contain impurities, the organometallic compound is preferably used in molar excess with respect to the transition metal compound. The catalyst level in the homonegeous system is conveniently based on the amount of organometallic compound employed, and will generally be in the range of 0.15 to 150 gram millimoles per 100 grams of monomers.

As discussed above, the homogeneous catalyst is generally utilized in the presence of a diluent to accomplish the polymerization reaction. Any diluent which is essentially inert to the reaction (except in those cases where the monomer is employed as the diluent) can be employed. Aliphatic, cycloaliphatic, and aromatic hydrocarbons containing from 4 to 10 carbon atoms per molecule can be employed. Examples of such hydrocarbons are n-pentane, n-butane, n-hexane, issoctane, n-decane, cyclohexane, cyclopentane, methylcyclohexane, benzene, toluene, and xylene. Additionally suitable diluents are halogenated compounds such as chlorobenzene, tetrachloroethylene, and 1,2-dichloroethylene. Mixtures of any of these diluents can also be employed.

The amount of omega-alkenyl-polycycloalkene or mixtures thereof with cyclic polyolefins used in the invention can be varied over a wide range. The resulting copolymer has significantly lower cold flow than that of the corresponding homopolymer of the cyclic monoolefin. The extent of reduction in cold flow desired will accordingly dictate the amount of comonomer(s) employed. Generally, significant cold flow redutcion is achieved with amounts of the omega-alkenyl-polycycloalkene varying from 0.001 to 50 parts by weight per 100 grams of other monomers (phm) (cyclic monoolefin and/or acyclic olefin) used, but preferably is in the range of from 0.025–5 phm. However, much larger amounts can be employed if desired. For example, up to 50 parts by weight of the omega-alkenyl-polycycloalkene per 100 parts by weight of total other monomers can be employed according to this invention, i.e., weight ratios of cyclic monoolefin/omega-alkenyl-polycycloalkene of at least 50/50 can be used. The omega-alkenyl-polycycloalkene or mixtures thereof with polycyclic olefins can be added initially or at any time prior to shortstopping of the polymerization reaction.

At higher levels, the omega-alkenyl-polycycloalkene type of comonomer tends to produce gel-containing products. However, this tendency can be reduced by increasing the level of acylic olefin employed in the polymerization recipe when preparing polymers containing the acyclic olefin monomer. When preparing the copolymers of the invention in the absence of the acyclic olefin monomers, suitable low levels of omega-alkenyl-polycycloalkene monomers can be employed when gel-free products are desired.

When preparing the terpolymers of the invention, the lower molecular weight acyclic olefins such as ethylene, propylene, butenes, pentenes, and hexenes are most frequently employed. The terpolymer exhibits a desirable balance of the properties of cold flow and molecular weight. The amount of lower molecular weight acyclic olefin employed generally determines the extent of the reduction in inherent viscosity. Single olefins or mixtures of olefins can be used in the process. Amounts are generally in the range of 0.01 to 10, preferably about 0.05 to 1.0, parts by weight per 100 parts by weight of the other monomers.

Any conventional contacting technique can be utilized to prepare the polymer, and batchwise or continuous operations are contemplated with both heterogeneous and homogeneous catalysts. After the reaction period, the polymer can be separated and isolated by conventional techniques such as by precipitation, coagulation, steam stripping, and the like. Unconverted monomer or products not desired can be recycled or discarded as desired. If desired, the catalyst can be destroyed using various materials well known in the art such as water or alcohol to deactivate the catalyst prior to separation of the products.

The copolymers of the cyclic monoolefins and omega-alkenyl-polycycloalkenes are believed to be characterized by linear chains of the cyclomonoolefin obtained by ring opening of the cyclomonoolefin and omega-alkenyl-polycycloalkene monomeric units which retain the double bond within the cycloalkene portion after incorporation into the polymer. The omega alkenyl-polycycloalkene may be incorporated in the polymer chain in a random or nonrandom fashion. Although not completely understood, it is believed the reduction in cold flow obtained by incorporation of the omega-alkenyl-polycycloalkene in the polymer backbone occurs by reaction of a double bond to give rise to branching. Branching is believed to occur at the available double bond of the comonomer. The terpolymers of the invention are evident from the reduction of inherent viscosity obtained by including into the monomer feed the lower molecular weight olefin. The lowering of the molecular weight and broadened molecular weight distribution is believed to occur via an olefin disproportionation cleavage reaction of the polymer and the lower molecular weight olefin. Once again, however, this mechanism is not completely understood, and it is only the best hypothesis for our invention.

The rubbery products prepared according to the invention have a good balance of properties. They can be oil extended and mixed with carbon black to give vulcanizates which have excellent properties. The raw polymers have a high degree of green strength. These properties allow the polymers of the invention to have a wide range of application. They can be employed alone as tire tread or carcass stock or blended with other rubbers or plastics. They can be used to improve the tack and green strength of rubbers such as butadiene/styrene emulsion copolymers, cis-polybutadiene and other solution-polymerized conjugated diene polymers. They can also be employed in adhesive formulations. In the above applications, these polymers can be compounded and cured with conventional fillers, extenders, plasticizers, antioxidants, cure accelerators, crosslinking or curing agents, pigments, stabilizers and the like.

The invention is further illustrated by the following examples. However, the data as presented therein is for the purpose of illustration and should not be construed as limiting the scope of the invention as defined hereinabove.

Example I

Runs were conducted in which mixtures of cyclopentene and 1-hexene were polymerized with 2-vinyl-bicyclo(2,2,1)heptene-5 (commonly called 5-vinyl-2-norbornene) or dicyclopentadiene (DCPD) as the third monomer. The polymerization recipe is shown below and the results are presented in Table I.

POLYMERIZATION RECIPE

| | Parts, by weight |
|---|---|
| Toluene | 450 |
| Cyclopentene | 100 |
| 1-Hexene | 0.05 |
| 5-vinyl-2-norbornene (VNB) | Variable |
| Dicyclopentadiene (DCPD) | Variable |
| MoCl$_3$ (octanoate)$_2$ | 1.22 (2.25 mhm.) |
| Diethylaluminum chloride (DEAC) | 0.44 (3.60 mhm.) |
| Temperature, ° C. | 5 |
| Time, hours | 4.2 |

In each run toluene was charged to the reactor first followed by the cyclopentene. The 1-hexene was added next followed by 5-vinyl-2-norbornene or dicyclopentadiene except in the control run which contained neither of these compounds. At the end of the run to each polymerization mixture was added to a solution of the antioxidant 2,2'-methylene-bis(4-methyl-6-tert-butylphenol) in a 20/80 by volume mixture of isopropyl alcohol/toluene with the amount added being sufficient to provide about 1 part by weight the antioxidant per 100 grams of monomers charged. Each polymerization mixture was then coagulated with isopropyl alcohol and the polymer separated and dried.

TABLE I

| Run number | VNB, phm. | DCPD, phm. | Conversion, percent | Inherent viscosity [1] | Gel,[1] percent | Cold flow,[2] mg./min. |
|---|---|---|---|---|---|---|
| 1 | | | 62 | 2.17 | 0 | 9.97 |
| 2 | 0.24 | | 65 | 1.08 | 79 | 0 |
| 3 | 1.45 | | 62 | 0.67 | 71 | 0 |
| 4 | 0.44 | | 68 | 0.82 | 74 | 0 |
| 5 | | 0.29 | 67 | 2.98 | 0 | 5.84 |

[1] Determined according to U.S. Pat. 3,278,508, col. 20, notes a and b.
[2] Cold flow is measured by extruding the rubber through a ¼-inch orifice at 3.5 p.s.i. pressure and a temperature of 50° C. After allowing 10 minutes to reach steady state, the rate of extrusion is measured and reported in milligrams per minute.

The results shown in Table I demonstrate that at the levels employed, the 5-vinyl-2-norbornene gave products having no cold flow and containing gel. The results of Run 5 show that dicyclopentadiene (DCPD) at a level comparable to that of the 5-vinyl-2-norbornene in Run 2 reduced the cold flow somewhat compared to Run 1 and produced no gel.

Example II

Other runs were conducted employing the same polymerization recipe and polymer isolation procedure as that shown in Example I. In these runs much lower levels of 5-vinyl-2-norbornene (VNB) were employed. The results of these runs are given in Table II.

TABLE II

| Run No. | VNB, phm. | Conversion, percent | Inherent viscosity | Gel, percent | Cold flow, mg./min. |
|---|---|---|---|---|---|
| 1 | | 64 | 2.16 | 0 | 9.99 |
| 2 | 0.022 | 60 | 2.23 | 0 | 0.33 |
| 3 | 0.044 | 66 | 2.37 | 0 | 0 |
| 4 | 0.088 | 65 | 2.71 | 3 | 0 |

The results of Table II demonstrate that at VNB levels of about one-tenth that of dicyclopentadiene (DCPD) employed in Run 5 of Eaxmple I, products with no cold flow and no gel can be prepared.

Example III

Other runs were conducted in which still lower levels of 5-vinyl-2-norbornene were employed in a series of runs which employed the same polymerization recipe and polymer isolation procedure as that shown in Example I. The results from this series of runs is shown in Table III.

TABLE III

| Run No. | VNB, phm. | Conversion, percent | Inherent viscosity | Gel, percent | Cold flow, mg./min. |
|---|---|---|---|---|---|
| 1 | | 63 | 2.16 | 0 | 8.79 |
| 2 | 0.0019 | 61 | 2.14 | 0 | 7.48 |
| 3 | 0.0094 | 57 | 2.24 | 0 | 2.12 |
| 4 | 0.0187 | 59 | 2.25 | 0 | 0.78 |

The results of Table III demonstrate that at very low levels of 5-vinyl-2-norbornene employed a significant and measurable decrease in cold flow of the polymers thus prepared is achieved.

Reasonable variation and modification of the invention is possible without departing from the spirit and scope thereof.

We claim:

1. A process for the preparation of copolymers of cyclic monoolefins and omega-alkenyl-polycycloalkene compounds wherein the cyclic monoolefin monomer undergoes ring opening polymerization to provide a linear polymer segment which comprises contacting a mixture of at least one cyclic monoolefin and at least one omega-alkenyl-polycydloalkene compound with a molybdenum, tungsten, or rhenium containing oelfin disproportionation catalyst under conditions of pressure, temperature, and time sufficient to allow said copolymers to be formed.

2. The process of claim 1 wherein the cyclic monoolefin has 5 and 7–10 carbon atoms per molecule, and the omega-alkenyl-polycycloalkene is a compound containing a terminal unsaturation of the vinyl type in an aliphatic chain and an unsauration in a polycyclic system.

3. The process of claim 2 wherein the cyclic monolefin is cyclopentene, cycloheptene, cyclooctene, cyclononene, cyclodecene, and the omega-alkenyl-polycycloalkene is 2-vinyl - bicyclo(2,2,1)heptene - 5, 2 - buten-3'-yl-bicyclo (2,2,1)-heptene-5, 2-allyl-bicyclo(2,2,1)-heptene-5, 2-vinyl-bicyclo(2,2,2)octene-5, 2 - vinyl - 1,4-endomethylen-1,2,3,4,5,5a,8,8a-octahydronaphthalene or 3-allylindene.

4. The process of claim 3 wherein the cyclic monoolefin is cyclopentene and the cyclic polyolefin is 2-vinyl-bicyclo(2,2,1)heptene-5.

5. A process for the preparation of terpolymers of cyclic monoolefins, omega-alkenyl-polycycloalkenes, and acyclic olefins wherein the acyclic monoolefin monomer undergoes ring opening polymerization to provide a linear polymer segment which comprises contacting at least one cyclic monoolefin at least one omega-alkenyl-polycycloalkene, and at least one acyclic olefin with a molybdenum, tungsten, or rhenium containing olefin disproportionation catalyst under conditions of pressure, temperature, and time sufficient to allow said terpolymer to be formed.

6. The process of claim 5 wherein the cyclic monoolefin has 5 and 7–10 carbon atoms per molecule, and the acyclic olefin is a nontertiary, acyclic mono- or polyene having at least 2 carbon atoms per molecule, including cycloalkyl, cycloalkenyl and aryl derivatives thereof, mixtures of said acyclic olefins and mixtures of said olefins with ethylene.

7. The process of claim 6 wherein the cyclic monoolefin is cyclopentene, cycloheptene, cyclooctene, cyclononene, or cyclodecene, the omega-alkenyl-polycycloalkene compound is 2-vinyl-bicyclo(2,2,1)heptene-5, 2-buten-3'-yl-bicyclo(2,2,1) - heptene - 5,2 - allyl-bicyclo(2,2,1) -heptene-5, 2-vinyl-bicyclo(2,2,2)octene-5, 2-vinyl-1,4-endomethylene-1,2,3,4,5,5a,8,8a-octahydronaphthalene, or 3-allylindene, and the acyclic olefin is an acyclic monoolefin having 5 to about 10 carbon atoms per molecule.

8. The process of claim 7 wherein the cyclic monoolefin is cyclopentene, the omega-alkenyl-polycycloalkene compound is 2-vinyl-bicyclo(2,2,1)heptene-5, and the acyclic olefin is 1-hexene.

9. The process of claim 1 wherein a portion of said omega-alkenyl-polycycloalkene compounds is replaced by a cyclic polyolefin compound which is a cyclic hydrocarbon having at least two double bonds separated by a single bond or a fused ring cyclic polyolefin having at least one double bond in at least two of the rings.

10. The process of claim 5 wherein a portion of said omega-alkenyl-polycycloalkene compounds is replaced by a cyclic polyolefin compound which is a cyclic hydrocarbon having at least two double bonds separated by a single bond or a fused ring cyclic polyolefin having at least one double bond in at least two of the rings.

11. The process of claim 1 wherein the amount of the at least one omega-alkenyl-polycycloalkene compounds is 0.001 to 50 parts by weight per 100 parts of other monomers.

12. The process of claim 1 wherein the olefin disproportionation catalyst is molybdenum trichloride distearate plus diethylaluminum chloride.

13. The process of claim 5 wherein the amount of the at least one omega-alkenyl-polycycloalkene compounds is 0.001 to 50 parts by weight per 100 parts of other monomers.

14. The process of claim 5 wherein the olefin disproportionation catalyst is molybdenum trichloride distearate plus diethylaluminum chloride.

15. The polymer produced by the process of claim 1.
16. The polymer produced by the process of claim 2.
17. The polymer produced by the process of claim 3.
18. The polymer produced by the process of claim 4.
19. The polymer produced by the process of claim 9.
20. The polymer produced by the process of claim 5.
21. The polymer produced by the process of claim 6.
22. The polymer produced by the process of claim 7.
23. The polymer produced by the process of claim 8.
24. The polymer produced by the process of claim 10.

References Cited

UNITED STATES PATENTS

| | | | |
|---|---|---|---|
| 3,449,310 | 6/1969 | Dall'Asta | 260—93.1 |
| 3,502,626 | 3/1970 | Dall'Asta | 260—80.78 |
| 3,575,947 | 1/1971 | Crain | 260—93.1 |
| 3,403,139 | 9/1968 | Natta | 260—88.2 |
| 3,520,856 | 7/1970 | Dall'Asta | 260—79.5 |
| 3,567,699 | 3/1971 | Natta | 260—79.5 |

OTHER REFERENCES

G. Dall'Asta and G. Motroni, The Site of Ring Cleavage in the Ring-Opening Polymerization of Low Strained Cycloolefins, European Polymer Journal, 1971, vol. 7, pp. 707–16.

JOSEPH L. SCHOFER, Primary Examiner

R. E. BENJAMIN, Assistant Examiner

U.S. Cl. X.R.

260—88.2 D; 252—429 A